United States Patent [19]

Teske et al.

[11] 4,089,406
[45] May 16, 1978

[54] CHAIN DRIVE

[76] Inventors: Fritz Teske, Industriestrasse 28; Lothar Teske, Industriestrasse 30, both of Porz-Westhoven, Germany

[21] Appl. No.: 768,708

[22] Filed: Feb. 15, 1977

Related U.S. Application Data

[63] Continuation of Ser. No. 513,503, Oct. 9, 1974, abandoned.

[51] Int. Cl.² .................. B65G 19/08; B65G 19/20
[52] U.S. Cl. .................. 198/730; 74/230; 74/243 C; 74/243 NC; 74/245 C; 74/250 C; 198/814; 198/834
[58] Field of Search ............ 74/243 C, 245 C, 250 C, 74/243 NC, 243 R, 243 FC, 230; 198/730, 729, 728, 833, 814, 734, 834

[56] References Cited

U.S. PATENT DOCUMENTS

| 251,315 | 12/1881 | Stutz | 74/243 C |
|---|---|---|---|
| 1,201,748 | 10/1916 | Luce | 74/243 R |
| 1,475,596 | 11/1923 | Redler | 198/734 |
| 2,003,528 | 6/1935 | Best | 74/243 C |
| 2,385,923 | 10/1945 | Klaucke et al. | 74/250 C |
| 2,426,998 | 9/1947 | Hall | 198/730 |
| 2,757,784 | 8/1956 | Von Stroh et al. | 198/734 X |

FOREIGN PATENT DOCUMENTS

| 1,136,124 | 5/1957 | France | 198/730 |
|---|---|---|---|
| 6,073 | 9/1956 | Germany | 198/728 |

Primary Examiner—Bruce H. Stoner, Jr.
Attorney, Agent, or Firm—Spencer & Kaye

[57] ABSTRACT

A chain drive includes an endless chain formed of forked links and trained about a drive sprocket and a return sprocket. Each sprocket includes circumferentially arranged teeth and a polygon which radially supports the chain links as they travel about the sprockets. The drive sprocket engages the links only with the leading flanks of the sprocket teeth, while the return sprocket engages the forked links only with the trailing flanks of the sprocket teeth.

7 Claims, 4 Drawing Figures

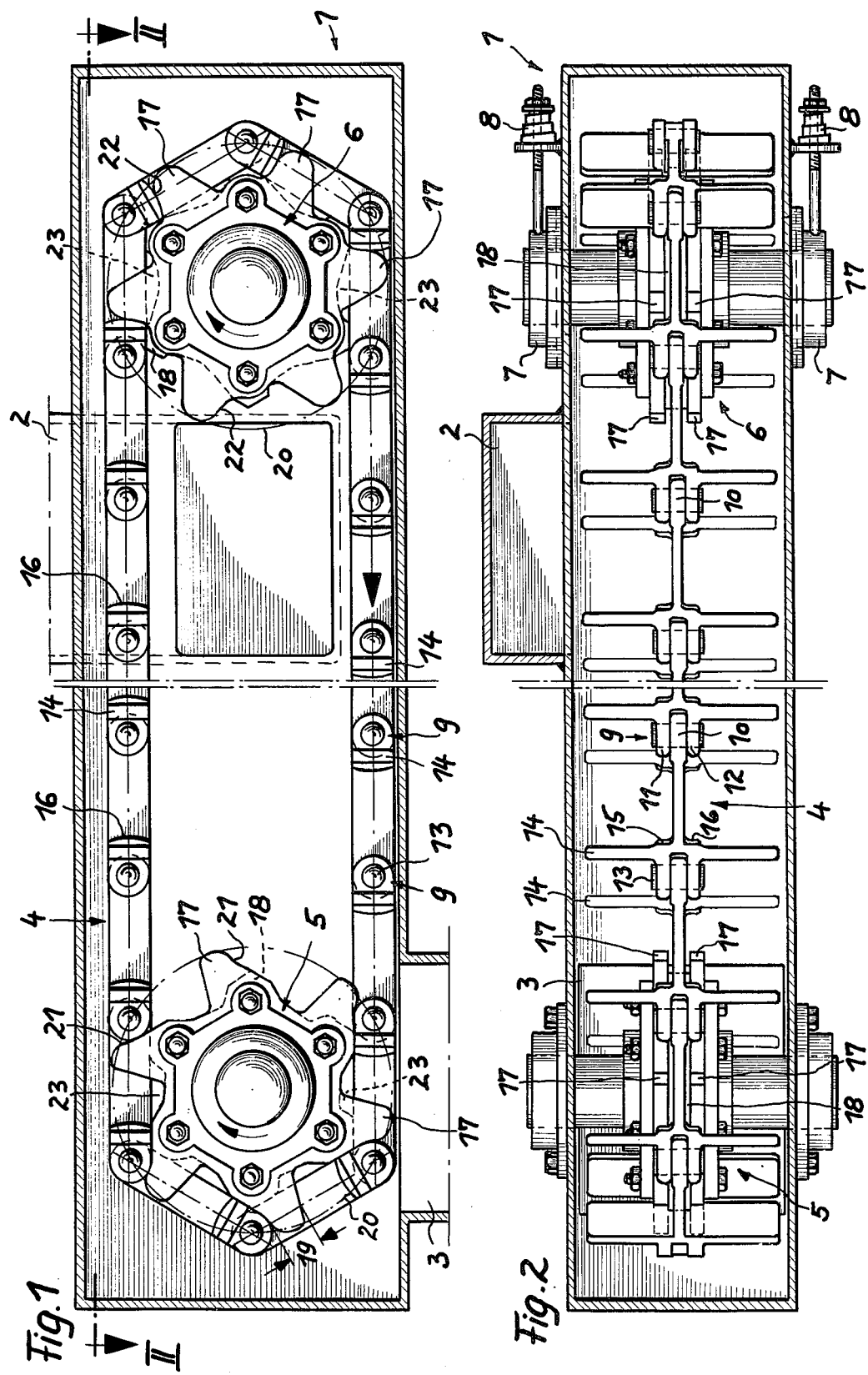

CHAIN DRIVE

CROSS REFERENCE TO RELATED APPLICATION

This application is a continuation of application Ser. No. 513,503, filed Oct. 9, 1974, now abandoned.

This invention relates to a chain drive and is particularly adapted for use in a drag chain conveyor. The chain drive is of the type that includes a forked link chain which is trained about a drive sprocket and a return sprocket also serving as a tensioning sprocket. The forked links, during their engagement with the sprockets, are supported in the radial direction on a polygon disposed between the sprocket teeth. The polygon is fitted to the pitch of the chain. The thickness of the teeth of both sprockets is smaller than the space between the shoulder faces at the base of the fork of one link and the fork ends of the adjoining link.

In drag chain conveyors for the continuous feed of bulk material there have been known forked link chains and sprockets in which both the drive sprocket and the return sprocket engage only with the leading flanks of the sprocket teeth the fork ends of the links and in which between the trailing tooth flanks and the shoulder faces of the forks there is provided a clearance of, for example, 3mm. This clearance serves for the compensation of manufacturing tolerances.

When, in a chain drive structured in the above-outlined manner the return sprocket is blocked, for example, by clogging caused by the bulk material, the forked link chain radially supported on the polygon of the return sprocket may abruptly slide back and forth to the extent to the above-noted clearance. This phenomenon is disadvantageous, inasmuch as it leads to an increased wear.

Further, in case of a blocked sprocket, those forked links of the chain which lead the sprocket by that clearance, engage only the edges of the polygon, so that, as a result, the forked links are exposed to bending stresses and thus often break.

There is further known a forked link chain with sprockets used as the traction means for a drag chain conveyor in which the teeth of both sprockets extend from the shoulder faces of the forks to the leg ends of the fork of the successive forked link and in which further the forked links, upon travel about the sprockets, are supported radially on a polygon disposed between the pair-wise arranged sprocket teeth; this prevents the forked links from sliding back and forth on the sprockets.

Even in case of an only partial blocking of the return sprocket, however, the danger still exists that the chain runs up the teeth of the return sprocket and thus is radially supported, similar to the previously outlined known chain drive, only at the edges of the polygon. Thus, in such a case, the forked links are additionally submitted to a bending stress. It is noted that in case of such a partial blocking of the return sprocket, the latter, by virtue of the increased chain tension, may be shifted against the force of a spring mechanism (which determines the chain tension) towards the drive sprocket. In this known chain drive, however, the danger is even more pronounced than in the previously described structure that during the transportation of bulk material that is likely to cake (such as brown coal), the bulk material accumulates between the teeth and also on the polygon arranged between tooth pairs and is thus compacted into cakes by the chain running thereon. Should this occurrence take place, the forked links, during their travel on the sprockets, run up the teeth in such a manner that the forked links will be supported radially only by the edges of the polygon and are thus additionally exposed to bending stresses. As a result, only the first tooth on each sprocket, as viewed in the direction of rotation, is in engagement with the forked link chain.

SUMMARY OF THE INVENTION

It is an object of the invention to provide an improved chain drive of the above-outlined type from which the discussed disadvantages are eliminated.

This object and others to become apparent as the specification progresses, are achieved by the invention, according to which, briefly stated, the drive sprocket engages the forked links only with the leading flanks of the sprocket teeth, while the return sprocket engages the forked links only with the trailing flanks of the sprocket teeth.

By virtue of the above-outlined measures the drive sprocket forwards the forked chain and the latter drives the return sprocket without clearance at all times even in case rotational resistances appear that are caused, for example, by accumulation of the transported bulk material. This drive without clearance is achieved without the forked link chain running up the sprocket teeth and the edges of the polygon, because both at the drive sprocket and at the return sprocket the torques, even in case of decreased chain tension, are transmitted to the chain or the return sprocket, as the case may be, not only through the surfaces of the polygon which support radially the forked links, but also through all the teeth of the chain sprockets.

As a further result of the structure according to the invention, the bulk material deposited between the teeth may be pushed out by means of the traveling forked link chain through the spaces between the shoulder faces of the forks and the trailing tooth flanks in case of the drive sprocket and between the shoulder faces of the forks and the leading tooth flanks in case of the return sprocket.

Advantageously, the magnitude of the above-mentioned intermediate spaces is designed to be greater than is necessary for the compensation of manufacturing tolerances.

It is further advantageous if the leading tooth flanks of the drive sprocket engage the ends of the fork legs and the trailing tooth flanks of the return sprocket engage the shoulder faces at the base of the fork legs.

BRIEF DESCRIPTION OF THE DRAWINGS

FIG. 1 is a side elevational view of a preferred embodiment of the invention.

FIG. 2 is a top plan view of the same embodiment taken along line II—II of FIG. 1.

DESCRIPTION OF THE PREFERRED EMBODIMENTS

Figure 3:
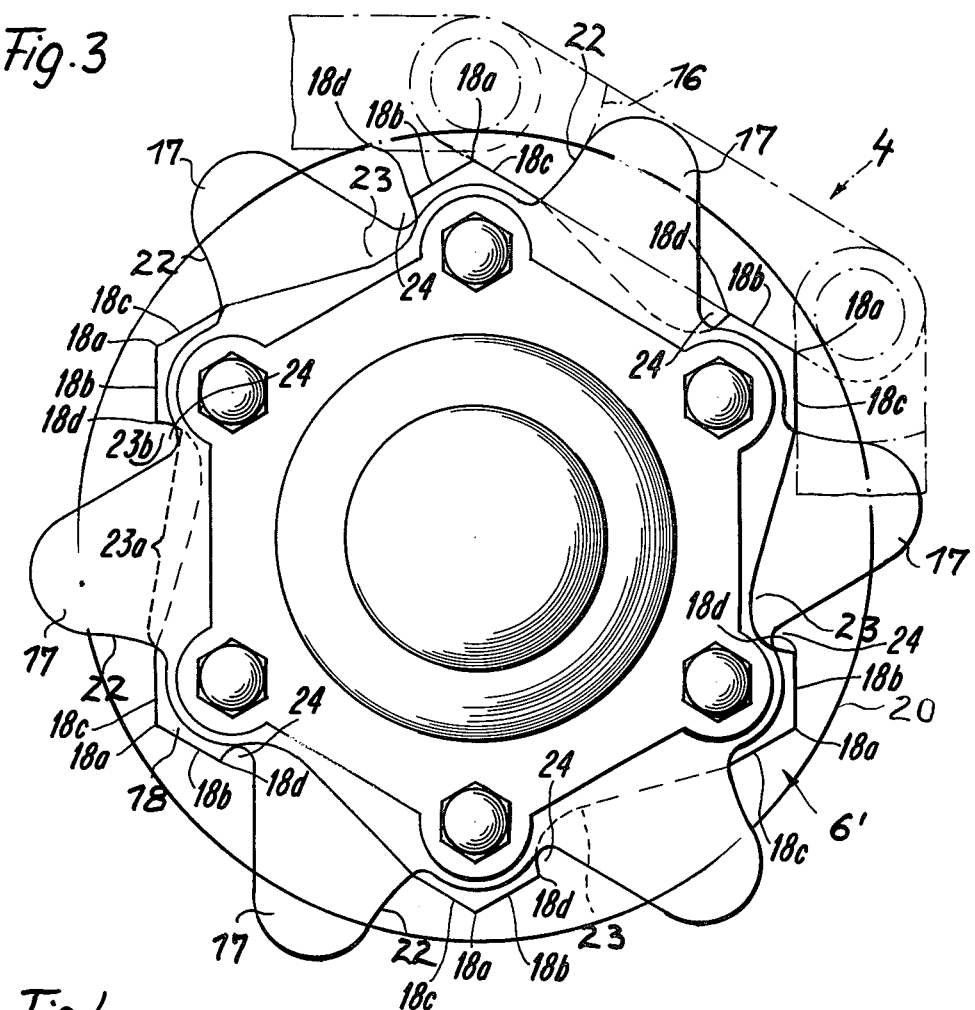
FIG. 3 is a side elevational view of a return sprocket designed according to another preferred embodiment of the invention.

Turning now to FIGS. 1 and 2, the drag chain conveyor illustrated therein is particularly adapted for the transportation of dust-generating bulk material, such as cement. The conveyor includes a trough 1 closed at all sides which has a lateral hopper 2 for receiving the bulk material and a discharge spout 3 at the other end of the trough 1 for the discharge of the material.

The traction device for the conveyor is constituted by an endless forked link chain 4 which is trained about a drive sprocket 5 and a return sprocket 6. The latter is formed as a chain tensioning device and is, for this purpose, associated with bearing brackets 7 which support the shaft of the return sprocket 6 and which may be adjusted in the longitudinal direction of the chain. With the bearing brackets 7 there are operatively connected springs 8 for providing the chain 4 with a constant predetermined bias.

Each forked link of the chain 4 has at one end a fork 9, while the other end has a link eyelet 10 which extends between the legs 11 and 12 of the fork 9 of the adjoining forked link. Through the aligned bores of the fork legs 11 and 12 and the eyelet 10 there is inserted a link pin 13. Each link further has a material carrier wing 14. The fork 9 of each link has, at the base of legs 11, 12, shoulder faces 15 and 16 oriented in the travelling direction of the chain. The ends of the fork legs 11 and 12 of each fork link are rounded. The radius of curvature of these rounded portions has its center (starting point) on the central axis of the link pin bores and corresponds to one half of the height of the fork link. The shoulder faces 15 and 16 cut off at 90° are also rounded; the radius of curvature of these rounded portions is greater than the entire height of the fork link. Here again, the center point of the curvature lies in the central axis of the link pin bores.

The drive sprocket 5 which is rotated by a motor and the return sprocket 6 each have a first and a second series of peripheral teeth 17. Between the two series which are axially spaced from one another, there is arranged a polygon 18 in such a manner that the forked links during their travel about the sprockets 5 and 6, are radially supported on the polygon sides.

As seen in FIGS. 1 and 2, each tooth series may consist, for example, of six teeth 17; the teeth 17 of the first series are in axial alignment with the teeth 17 of the second series to form a plurality of circumferentially consecutive tooth pairs.

The thickness 19 of the teeth 17, measured along the pitch circle 20, is smaller than the intermediate space between the shoulder faces 15, 16 and the ends of the fork legs 11, 12 of the adjoining forked link.

Further, the teeth 17 of the drive sprocket 5 are so arranged with respect to the polygon 18 that only the leading tooth flanks 21 (as viewed in the direction of rotation) engage the fork links, more precisely, the ends of the fork legs 11, 12, whereas in case of the return sprocket 6, it is only the trailing flanks 22 of the teeth 17 which engage the shoulder faces 15, 16.

In order to ensure an optimally minimum wear at the teeth 17 and the forked links, the teeth sides 21, 22 are so shaped from the tooth root up to the pitch circle 20 that they correspond to the rounded portions of the ends of the fork legs 11, 12 or the shoulder faces 15, 16, as the case may be. In this manner it is ensured that the face pressures between the sprocket teeth and the links are small and further, there is effected a rolling contact between engaging components, resulting in an optimally minimum wear of parts.

Those portions of the teeth 17 that lie radially outwardly of the pitch circle 20 are so shaped that during rotation of the sprockets there is ensured a practically friction-free rolling contact between the forked links and the sprockets.

In the sides of the regular polygon 18 at both sprockets 5 and 6 there are provided openings or cutouts 23 which flare outwardly of the respective sprocket in such a manner that during travel of the chain about the sprockets 5 and 6 the deposited bulk material is, by means of the chain 4, displaced from the support faces of the polygon sides into the openings 23 and is ejected therefrom outwardly through the intermediate spaces between the ends of the fork legs 11, 12 and the shoulder faces 15, 16. Expediently, the cutouts are arranged spaced from the polygon edges and are in substantial alignment with the space that extends from the shoulder faces 15, 16 of each chain link to the leg ends 11, 12 of the adjoining chain link as they are in engagement with the polygon 18 of the drive sprocket 5 or the return sprocket 6. Further, each cutout 23 extends into the axial space between the teeth forming the tooth pairs.

Stated differently, each cutout 13, as well seen, for example, in FIG. 3, has a first (or major) portion 23a which is axially adjacent the tooth 17 with which the cutout 23 is associated and a second (or minor) portion 23b which is situated circumferentially adjacent the respective tooth 17. As it may be well observed in FIGS. 3 and 4, the cutouts 23 provided in the sides of the polygon 18 thus leave, on each side of the axially extending polygon edges 18a (which separate the polygon sides from one another), peripheral areas 18b and 18c which serve as radial supports for the chain links. The peripheral support areas 18b and 18c are, substantially in their entirety, out of registry with any of the teeth 17 when viewed axially. Further, as may be particularly well observed in FIG. 3, it is solely the support areas 18b and 18c which provide for a radial support for the links of the chain 4 in the sprocket. This radial support is thus arranged externally of the zone of any of the teeth 17 when viewed circumferentially. The minor portions 23b of the cutouts 23 provide — as viewed in the circumferential direction — a gap 24 between the axially extending terminal edge 18d of each support area 18b and the foot of the circumferentially adjoining tooth 17.

Figure 4:
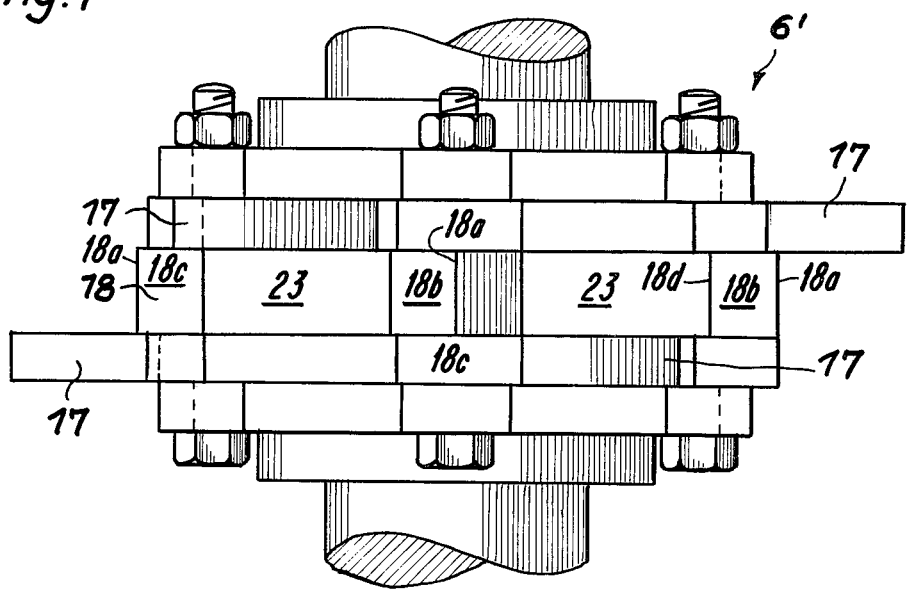
FIG. 4 is a top plan view of the structure illustrated in FIG. 3.

FIGS. 3 and 4 illustrate a return sprocket 6' in which alternately the left and the right tooth 17 of each tooth pair is missing. Stated differently, the teeth on both sprockets are arranged in the circumferential direction alternatingly along one and the other side of a radial plane of symmetry that is normal to the sprocket axis. In this manner a self-cleaning of the chain drive is substantially enhanced.

It will be understood that the above description of the present invention is susceptible to various modifications, changes and adaptations, and the same are intended to be comprehended within the meaning and range of equivalents of the appended claims.

We claim:

1. In a chain drive including an endless drag conveyor chain formed of interconnected links, each link having a fork constituted by parallel-extending fork legs including a base portion, shoulder faces disposed at the base portion and fork leg ends remote from the base portion; a drive sprocket and a return sprocket about which the chain is trained; each sprocket having an axis of rotation, first and second series of teeth arranged circumferentially on the periphery of each sprocket, the first series of teeth and the second series of teeth defining an axial space therebetween; each tooth having a leading flank and a trailing flank, each tooth having a circumferentially measured thickness that is smaller than the distance from the shoulder faces to the fork ends of the adjoining link; each sprocket further having a polygon disposed in the space between the first and the second series of teeth; the polygon having axially parallel edges separating the polygon sides from one another, the polygon having peripheral support faces for radially supporting the links in their passage on the sprockets, the improvement wherein each said peripheral support face of said polygon is formed of a narrow support area at both sides of each said edge of the polygon, each said area defining a plane parallel to the sprocket axis and extending between said tooth series in said axial space and being substantially out of registry with any of said teeth when viewed circumferentially; each said support area further being, when viewed in the axial direction, substantially in its entirety out of registry with any of said teeth for providing a radial support for said links adjacent said teeth when viewed circumferentially; said support areas of said polygon constituting the sole radial support of said links in said sprockets; said links being substantially without radial support at any location in circumferential alignment or in axial alignment with any of said teeth.

2. A chain drive as defined in claim 1, wherein said leading flanks of said drive sprocket teeth are in engagement with said fork ends and said trailing flanks of said return sprocket teeth are in engagement with said shoulder faces of said fork legs.

3. A chain drive as defined in claim 2, wherein each said fork leg end is rounded with a first radius of curvature having a length that is one half the link thickness; each said shoulder face is rounded with a second radius of curvature having a length that is greater than that of said first radius of curvature; each said leading flank of said drive sprocket teeth conforming, from the tooth root to the pitch circle, to the configuration of the rounded leg ends of each link; each said trailing flank of the return sprocket teeth conforming, from the tooth root to the pitch circle, to the configuration of the rounded shoulder faces.

4. A chain drive as defined in claim 1, wherein the teeth of the first series and the teeth of the second series are arranged alternatingly in the circumferential direction on one and the other side of the sprocket with respect to a radial plane of symmetry normal to the sprocket axis.

5. A chain drive as defined in claim 1, including chain tensioning means connected to said return sprocket.

6. A chain drive as defined in claim 1, wherein each said link has material carrier wing means.

7. A chain drive as defined in claim 1, wherein said edges constitute first edges and wherein each said support area has a second, terminal edge extending spaced from and being parallel to the respective first edge; at least some of said second edges being circumferentially spaced from the trailing flank of the tooth adjoining the respective second edge for defining a gap in the circumferential direction between some of said support areas and the adjoining tooth flank.

* * * * *